April 7, 1964 K. L. DIEHL 3,127,771
GAUGE DRIVE SYSTEM
Filed June 14, 1962 2 Sheets-Sheet 1
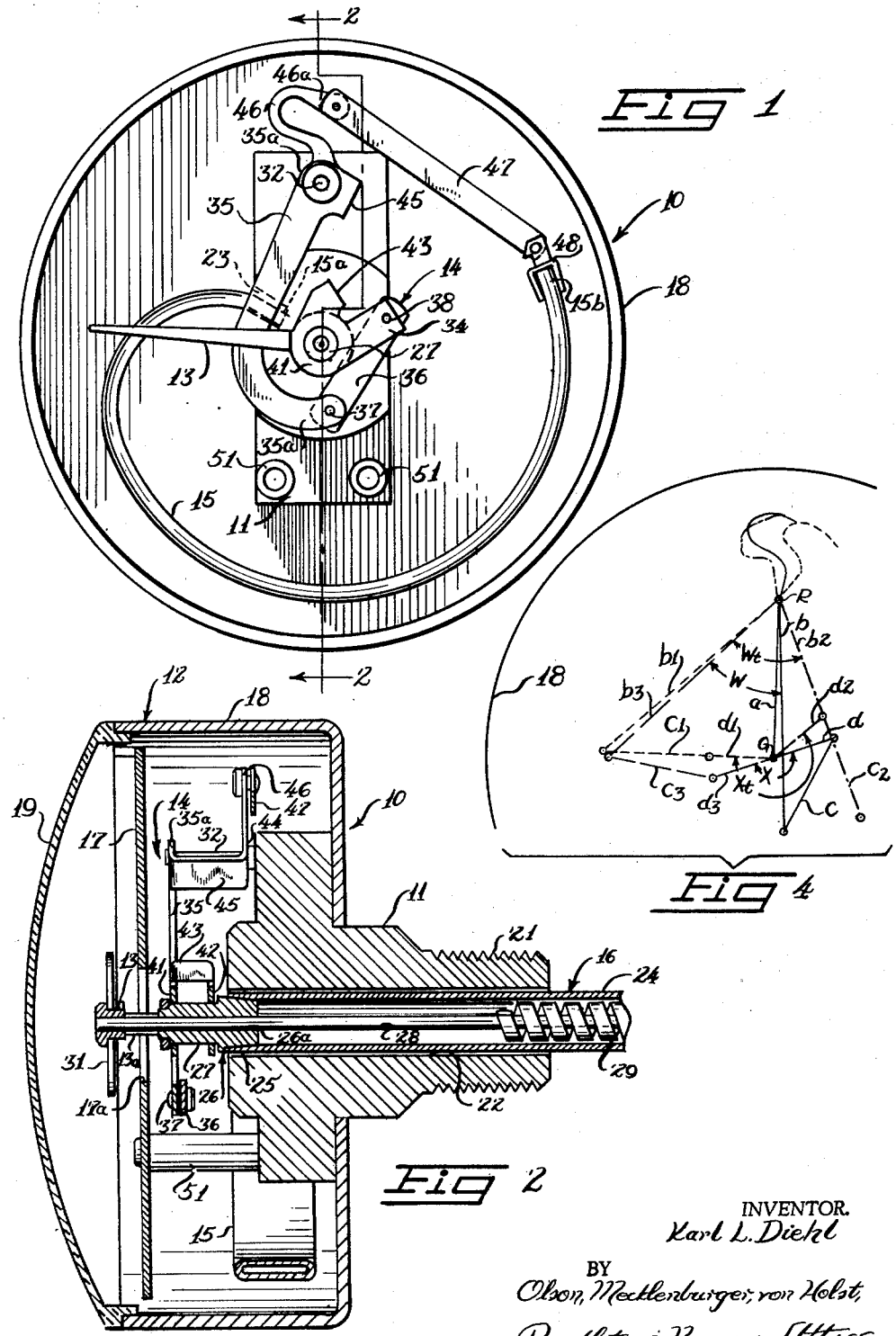
INVENTOR.
Karl L. Diehl
BY
Olson, Mecklenburger, von Holst,
Pendleton, & Neuman Attys April 7, 1964    K. L. DIEHL    3,127,771
GAUGE DRIVE SYSTEM
Filed June 14, 1962    2 Sheets-Sheet 2

INVENTOR.
Karl L. Diehl
BY
Olson, Mecklenburger, von Holst,
Pendleton & Neuman    Attys United States Patent Office 3,127,771
Patented Apr. 7, 1964

3,127,771
GAUGE DRIVE SYSTEM
Karl L. Diehl, Chicago, Ill., assignor to Colorado Oil and Gas Corporation, Denver, Colo., a corporation of Delaware
Filed June 14, 1962, Ser. No. 202,538
15 Claims. (Cl. 73—345)

This invention relates to drive systems in gauges and more particularly to an improved linkage drive for compact gauges.

Various gauge drive systems have been proposed for transmitting the motion of a sensing element, such as a Bourdon tube, to an indicator. These prior constructions have included gear and linkage drives, or gearless drives utilizing various arrangements and numbers of links. The present invention is directed to improvements in linkage drives for such gauges, and more specifically to an improved compact gearless drive linkage particularly adapted for small or compact gauges, e.g., gauges having about 1½″ to about 3″ diameter housings.

A desirable drive system and gauge of the type to which this invention is directed should possess or contribute to a number of desirable design criteria. The system should be economical and must provide accurate response. Primary aspects of the criteria of economy include the use of a minimum number of parts and maximum simplicity and ease of manufacture and assembly. Such a system should also translate the short distances of movement of the sensing element into a large arc of indicator movement, i.e., 160° to 180°, or greater, to permit the use of a large scale for easy and accurate reading and interpretation. The parameter of a large indicator arc must be obtained under circumstances which safeguard against dead stop, dead center or toggle positions of the drive system, and the indicator response of the system should be as near linear as possible with respect to the sensing element input to provide uniform accuracy and ease of reading over the entire indicator arc. Further, the system should be a rugged one, not subject to excessive wear under adverse conditions of use, and backlash as well as the adverse effects of wear should be minimized.

Accordingly, it is an object of this invention to provide an improved gauge construction including a drive system which meets or contributes to obtaining the desirable characteristics outlined above.

It is an object of this invention to provide an improved linkage drive arrangement for gauges.

It is another object of this invention to provide an improved gauge with a linkage drive system adapted to provide a large arc of indicator movement even in a small gauge and with a short range of input movement from the sensing element.

It is another object of this invention to provide an improved gauge with a linkage drive system which is capable of providing a large arc of indicator movement and near-linear indicator response.

It is another object of this invention to provide a simple and economical gauge construction which meets the foregoing objects.

It is another object of this invention to provide a gauge drive system which is economical to fabricate, rugged, accurate, and which maintains its accuracy in use.

These and other objects and advantages of this invention will appear to those skilled in this art from the description, accompanying drawings and appended claims.

In carrying out this invention in one illustrative form, a compact gauge is provided comprising a sensing element, a pivoted indicator, and a drive linkage connecting the sensing element to the indicator. The linkage constitutes a 4-bar linkage including first and second links of effective lengths $d$ and $b$ mounted on first and second pivot posts, respectively, the posts being disposed within the gauge housing and spaced apart a fixed distance $a$. A third link of effective length $c$ is pivotally connected to the free ends of both of the first two links. The first and second links are connected to the indicator and sensing element respectively, and the following relationships apply: $d$ is greater than ¼″ but less than $a/2$; $b$ is less than $2a$ but greater than $a$, and $a-d+c$ equals between about $0.85b$ and about $1.15b$. The individual links are formed of flat sheet stock and the first and second links include spaced leg portions engaging said pivot posts. The second link is adapted to extend around said first pivot post on the side opposite the second pivot post, and the third link is adapted to extend on said opposite side of the second post.

For a more complete understanding of this invention, reference should now be had to the drawings wherein;

FIG. 1 is an enlarged front elevation view of a combined pressure and temperature gauge employing the teachings of this invention, with the cover, dial and temperature pointer removed;

FIG. 2 is a sectional view of the gauge of FIG. 1 taken along line 2—2 and looking in the direction of the arrows;

FIG. 4 is a schematic diagram of the drive system of the gauge in FIG. 1 and illustrating various positions of the linkage;

Figure 3:
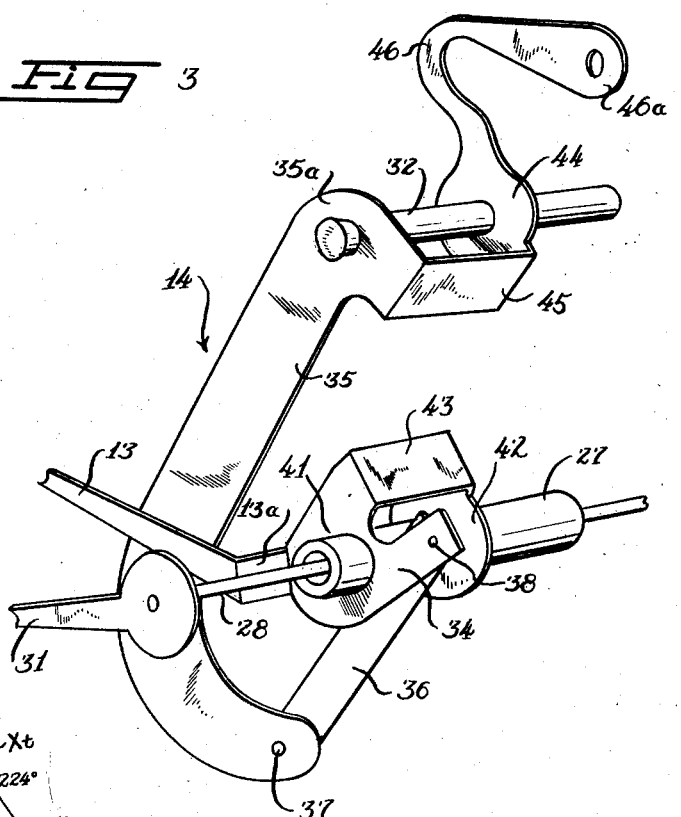
FIG. 3 is an enlarged partially schematic perspective view of the drive system of the gauge in FIG. 1.

Referring now to the drawings, 10 indicates generally a gauge of the Bourdon tube type. This gauge includes a block 11 which receives and supports the remaining elements including a housing 12, an indicator 13, a linkage 14 for driving the indicator in response to the movement of the free end of a Bourdon tube 15, a temperature measuring element 16, and a dial 71. The housing includes a hollow generally cylindrical case 18 and a transparent cover 19.

The block 11 is threaded at 21 for connection to a pressure line or system, and is hollow as at 22 to permit passage of the pressure medium to a tap connection with one end 15a of the Bourdon tube 15. The end 15a of the tube may be soldered in a recess 23 in the block 11 to obtain a simple and effective connection as indicated in FIG. 1.

The temperature measuring element 16 includes a bulb 24 closed at its outer end (not shown) and mounted in the hollow passage or bore 22 of the block. The bulb is smaller in diameter than the passageway 22 to permit passage of the pressure medium therealong, and is secured in the block at its inner end as by soldering at 25. The solder at 25 also seals the inner end of the bore 22 around bulb 24. A plug 26 is mounted in the inner end of the bulb 24 and extends therefrom to serve as a mounting pivot post 27 disposed coaxially with cylindrical housing 12. The plug 26 is formed with an axial bore 26a to receive a drive shaft 28. The drive shaft is connected to a thermal-responsive helical bi-metal element 29 within the bulb 24 and to a pointer 31 disposed between the dial 17 and cover 19.

Referring now particularly to FIGS. 1–3, the linkage connecting the free end 15b of tube 15 to indicator 13 is pivotally supported on post 27 and on a second fixed pivot post 32 fixed to block 11. This linkage includes a first bar 34 pivotally mounted on post 27, a second bar 35 pivotally mounted on post 32, and a third bar 36 pivotally connected to the free ends of bars 34 and 35 by staked pins 37 and 38.

The bar 34 is integral with indicator 13, and includes an integral generally U-shaped body portion comprising a central or leg portion 41 and an end leg portion 42 spaced from the portion 41 by a connecting bridge or bight portion 43. The central and end portions provide widely separated narrow areas of bearing engagement with post 27. The pointer 13 includes a base offset portion 13a which extends outward from central portion 41 through an opening 17a in dial 17. This integral unit, comprising the bar 34, indicator 13, and the body portion, may be simply and economically formed as a single stamping, for instance from a piece of sheet metal.

Bar 35 includes a similar integral body portion comprising a mounting leg portion 35a, and end leg portion 44 and a bridge or bight portion 45. The leg portions 35a and 44 engage post 32 and provide widely spaced narrow bearing areas. A gooseneck section 46 is integral with and extends from leg portion 44. This unit, comprising bar 35, the integral body portion and gooseneck 46 may also be formed as a simple stamping, such as from suitable sheet material.

A connecting bar 47 connects to the free end 46a of the gooseneck and to a saddle 48 which is secured to and seals the free end 15b of the Bourdon tube.

Referring now to FIGS. 1 and 4, the disclosed drive linkage 14 is essentially a 4-bar linkage wherein the fixed pivot posts 27 and 32 define a fixed bar of an effective length $a$ equal to the distance between the axes R and Q of pins 27 and 32. The other three bars of the linkage comprise movable bars 34, 35 and 36 of effective lengths $d$, $b$ and $c$, respectively (see FIG. 4).

Locating pivot post 27 and consequently axis R in the center of the gauge housing permits the use of a maximum size scale, i.e., extending over an arc of 180° or greater, and with an arc radius substantially equal to the radius of the casing 12. However, this placement of post 27 and axis R also establishes that the distance $a$ must be less than the radius of the gauge housing, and with the gooseneck or adjustment lever 46 disposed on the radially outer side of axis Q, the distance $a$ must be substantially less than the housing radius to provide clearance for the gooseneck.

The angle of movement or working angle W of the gooseneck lever and bar 35 is normally limited to about 50° by the elastic limit of the Bourdon tube in this type of gauge. Linkage 14 must amplify this movement into a corresponding usable indicating arc X of bar 34 and indicator 13 of at least 160°, or greater. To obtain such a usable indicator arc, the linkage system must be designed for an even larger available arc of movement of the indicator ($X_t$) to permit selection of a usable indicating arc X within which the movement of the indicator will be near linear with respect to the movement of the end of the Bourdon tube. This latter aspect will be appreciated by considering FIG. 4 wherein various positions of the linkage of the gauge of FIG. 1 are illustrated, the solid lines representing the bars as shown in FIG. 1 and the dash lines $b_1$, $c_1$, $d_1$, and the dot-dash lines $b_2$, $c_2$, $d_2$, illustrating two extreme positions wherein the linkage has reached a toggle or an end position. Near the end limits the relative movements between bars 34 and 35 vary considerably, and in the end positions the linkage may become locked on dead center or even reverse the direction of motion of bar 34. For these reasons, the usable indicating arc X of bar 34 should terminate approximately 20° short of either end limit of the theoretically available indicating arc $X_t$, note for instance the positions illustrated by the solid lines $b$, $c$, $d$ and by broken lines $b_3$, $c_3$, and $d_3$. Stops (not shown) for the indicator 13 may be secured to the face of the dial at the ends of the desired usable indicator arc to guard against the linkage accidentally reaching one of its end positions.

Several structural problems or limitations are also encountered when an actual linkage is constructed embodying the concepts illustrated in FIG. 4. Referring to FIG. 1, if the indicator is to be longer than the clearance between pins 27 and 32, commensurate with providing a large radius index, or if the indicator is to be positioned in front of the linkage, at least one end limit of linkage movement is determined by interference between parts of the linkage, for instance by bar 35 engaging base portion 13a or the bridge portion 43 or the mounting pin 27. Also, if bar 35 is too long, as measured radially from pin 32, the bar will strike the case 18 or the dial supports 51.

The desired large angle of movement of the indicator 13 is obtained in the illustrated construction by utilizing a linkage within several design parameters. First, bar 35 is of a length $b$ greater than dimension $a$, but less than $2a$. Second, bars 35 and 36 are designed to extend around the side of pin 27 opposite pin 32. Bar 35 is formed with an angularly disposed end portion 35a at a distance greater than $a$ from pin 32 to extend across the side of pin 27 opposite pin 32 when bar 35 is near one end position as in FIG. 1. Bar 35, in effect, can then be moved across the fixed line between posts 27 and 32, to the position illustrated in FIG. 1 and at $b$ in FIG. 4, without engaging the linkage or post structure. This also maintains the range of movement of bar 35 near the center of the gauge thereby avoiding interference from the casing wall when the linkage approaches its outer end position $b_1$, $c_1$, $d_1$. The configuration of bar 35, together with the limitation of its effective length to being less than twice the distance $a$ ($2a$), permits its movement through an adequate and appropriate working angle W despite the physical limitations encountered in this type of gauge.

Four bar linkage drives for gauges have previously been known, see for instance, Ruopp U.S. Patent No. 1,939,466. However, such known systems have utilized relatively short indicator drive arms ($d$). In compact gauges this results in a bar of very small dimensions with attendant problems of assembly, wear of such fine parts, and large errors due to wear or misalignment. Such curtailment of the length $d$ also prohibits the use of a large pivot post to accommodate other apparatus, for instance a temperature sensing element 16 with a coaxial drive shaft. The linkage 14 illustrated herein overcomes such difficulties by permitting and incorporating a bar 34 that is at least ¼" in effective length, even in compact gauges. However, bar 34 is maintained shorter than $a/2$ to aid in obtaining a large indicator angle with a small input angle W of bar 35.

Figure 5:
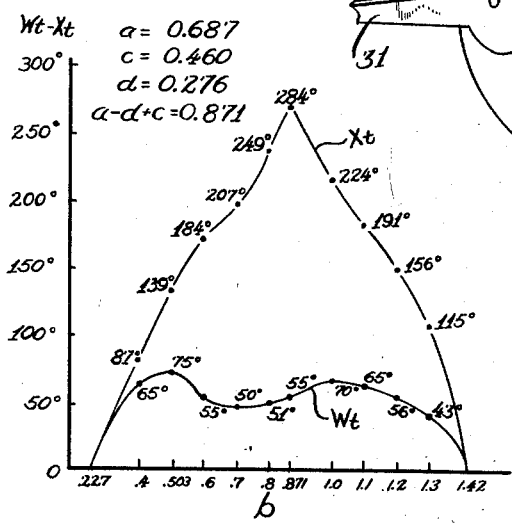
FIG. 5 is a graph representing various indicator angles and drive bar working angles of a linkage as in FIG. 4 as the length of bar $b$ is varied.

Within the range of the above prescribed parameters, the various bars of the linkage drive should conform to the relationship $a-d+c$ equals about $0.85b$ to about $1.15b$. The criticality of this relationship is well demonstrated by the graph in FIG. 5 which illustrates the variation in the maximum available angle of movement $X_t$ of bar 34 of a linkage such as linkage 14, wherein the relative lengths of the remaining bars are $a=0.687$, $c=0.460$, $d=0.276$, as the length $b$ of bar 35 is varied. The corresponding values for the working angle $W_t$ of bar 35 are also plotted. First, it will be observed that the $X_t$ curve has a rather sharp peak between points where $b$ equals about 0.75 and 1.0, i.e., when $a-d+c$ equals between about $1.15b$ and about $0.85b$, with the maximum value of $X_t$ occuring at the point where $b=0.871$ and $a-d+c=b$. Further, the $W_t$ curve dips at approximately the same values, resulting in a high magnification ratio ($X/W$) for the drive system in the designated range, and particularly in that part of the range where $a-d+c$ equals between about $1.15b$ and $1.0b$.

A drive system for a 2½" diameter gauge and embodying this invention was constructed as illustrated in FIGS. 1 and 2 with the following dimensions:

Distance $a$—0.687"

Effective length $b$ of bar 35—1.0"

Effective length $c$ of bar 36—0.460"

Effective length $d$ of bar 34—0.276"

and provided:

Maximum indicator arc $X_t$—224°
  Corresponding working angle $W_t$—70°
Usable indicating arc X—about 180°
  Corresponding working angle W—about 48°
Angular magnification ratio $(X/W)$—about 3.75

This system has been incorporated in one commercial gauge wherein an indicating arc of 162° is utilized, with a corresponding working angle of about 44°.

The final values for the bar lengths, and the selection of the portion of the indicating arc to be utilized may be determined by processes which illustrate another advantage of this invention. One method of checking linearity of a gauge drive system is to compare the angle of movement of the indicator as the input member is moved through each half of its working angle; that is, to check the half-values of the working angle W and the indicating angle X to ascertain whether or not the indicator is at the mid-point of its indicating range when the bar 35 is at the mid-point of its working angle. Assuming values of $a$, $d$ and $b$, and approximating a value for $c$ within the above prescribed linkage parameters, the linkage may be solved for a value for $c$ which will provide the desired mid-point coincidence. Alternatively, and particularly where the available indicator angle is much greater than the desired indicating arc, the segment of the available angle which best approximates linearity may be selected as the working arc.

Figure 6:
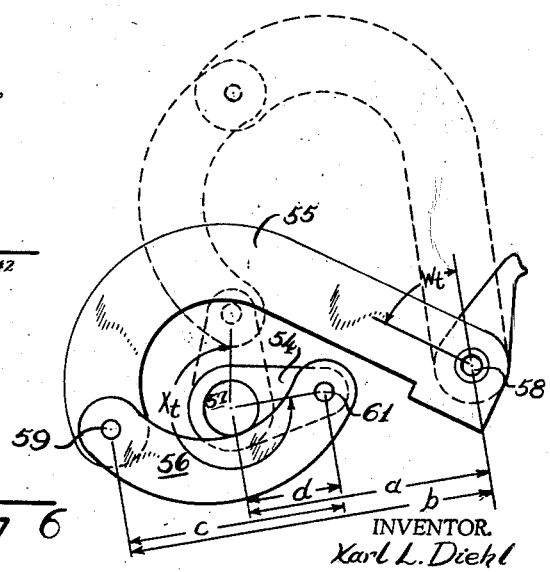
FIG. 6 is a schematic front elevation view of a modified linkage employing teachings of this invention.

Another design of a linkage system embodying this invention is illustrated in FIG. 6. In this system, the effective lengths of bars 54 $(d)$, 55 $(b)$ and 56 $(c)$ are so related to the distance $(a)$ between the fixed pivot axes of posts 57 and 58 that $a-d+c=b$. Bar 55 is curved in the same manner as bar 35, and bar 56 is curved in the same direction so that the system may move around post 57 to the end position illustrated in solid lines in FIG. 6. In this position posts 57 and 58 and pivot pins 59 and 61 are in alignment. The opposite end (toggle) position is illustrated in broken lines. In one system as in FIG. 6, and wherein $a=0.625''$, $b=0.940''$, $c=0.565''$ and $d=0.250''$, the maximum available indicator arc $X_t=280°$. Even allowing a 40° margin for bar 54 from the folded end position shown in solid lines in FIG. 6, and a 20° margin from the other end position, this system provides an indicator arc X of about 220° with a corresponding working angle W of 50°. The angular magnification ratio is thus about 4.4.

It will be obvious that other modifications of the specific embodiments shown may be made by those skilled in this art, in light of the foregoing disclosure, without departing from the spirit and scope of the invention.

It will thus be seen that an improved gauge drive system has been provided which is adapted to furnish a large indicator arc, even in compact gauges and with a limited input movement from a sensing element. Further, the system is well adapted to provide near-linear response, and the prescribed linkage arrangement permits accurate pre-computation of the linkage system. The bearings at the support posts are of small contact area but provide secure alignment because of the relatively large distance between the post engaging portions. The design of the links and of the linkage minimizes backlash and the effects of wear, and provides initial and continued accuracy of response. Further the system may be fabricated of very few parts which are simple and inexpensive to manufacture and fabricate, resulting in a rugged improved gauge drive system which is economical to produce and fabricate.

While particular embodiments of this invention are shown and described above, it will be understood, of course, that the invention is not to be limited thereto, since many modifications may be made by those skilled in this art in light of the foregoing teachings. It is contemplated, therefore, by the appended claims, to cover any such modifications and variations as fall within the true spirit and scope of this invention.

I claim:

1. A compact gauge including a sensing element, an indicator, and a linkage connecting said sensing element and said indicator; said linkage including a first link connected to said indicator and supported for pivotal movement about a first axis fixed relative to said gauge, a second link connected to said sensing element and supported for pivotal movement about a second axis fixed relative to said gauge and spaced a distance $a$ from said first axis, and a third link pivotally joined to said first and second links at points spaced distances $d$ and $b$ from said first and second axes, respectively, and spaced apart a distance $c$; and wherein $d$ is less than $a/2$ but greater than $\frac{1}{4}''$, $b$ is less than $2a$ but greater than $a$, and $a-d+c$ falls within the range from about $0.85b$ to about $1.15b$.

2. A gauge as in claim 1 and including a housing, said first axis being disposed centrally of said housing.

3. A gauge as in claim 1 and wherein said second link includes a distal end portion angularly disposed relative to a line extending through said second axis and said distal end portion.

4. A gauge as in claim 3, and said linkage being positioned for movement of the distal end of said second link on the side of said first axis generally opposite said second axis.

5. A gauge as in claim 1 and wherein said second link includes a first portion, and a distal end portion extending at an angle relative to said first portion, said first portion extending on one side of said first axis, said distal end portion being disposed at a distance greater than $a$ from said second axis and extending generally toward said first axis from said first portion to extend on the side of said first axis opposite said second axis when said first portion is adjacent said first axis.

6. A gauge as in claim 1 and wherein said third link is of an angular configuration and adapted to extend around said first axis.

7. A compact gauge including a housing, a sensing element, an indicator, and a linkage connecting said sensing element and said indicator; said linkage including a first link connected to said indicator and supported for pivotal movement about a first axis disposed centrally of and fixed relative to said housing, a second link connected to said sensing element and supported for pivotal movement about a second axis fixed relative to said housing, said second axis being spaced inward from the periphery of said housing and spaced a distance $a$ from said first axis, and a third link pivotally joined to said first and second links at points spaced distances $d$ and $b$ from said first and second axes, respectively, and spaced apart a distance $c$, wherein $d$ is less than $a/2$ but greater than $\frac{1}{4}''$, $b$ is less than $2a$ but greater than $a$, and $a-d+c$ falls within the range from about $0.85b$ to about $1.15b$, and means extending outward of said second fixed axis, on the side disposed away from said first fixed axis, and connecting said sensing element to said second link.

8. A compact temperature and pressure gauge including a pressure sensing element, an indicator, a linkage connecting said sensing element and said indicator, a temperature pointer, and temperature responsive means, said linkage including a first link connected to said indicator and mounted on a pivot post for pivotal movement about the axis of said pivot post, a second link connected to said sensing element and supported for pivotal movement about an axis fixed relative to said pivot post and spaced a distance $a$ from the axis of said pivot post, and a third link pivotally joined to said first and second links at points spaced distances $d$ and $b$ from said pivot post axis and said second axis, respectively, and spaced apart a distance $c$; and wherein $d$ is less than $a/2$ but greater than $\frac{1}{4}''$, $b$ is less than $2a$ but greater than $a$, and $a-d+c$ falls within the range from about $0.85b$ to about $1.15b$, said pivot post having a bore therethrough, a drive shaft extending through the bore of said pivot post, said temperature pointer being connected to said drive shaft on one side of said pivot post and said temperature responsive means being connected to said drive shaft on the other side of said pivot post.

9. A linkage drive system including a first link mounted for pivotal movement about a first axis, a second link mounted for pivotal movement about a second axis fixed relative to said first axis and spaced a distance $a$ from said first axis, and a third link pivotally joined to said first and second links at points spaced distances $d$ and $b$ from said first and second axes, respectively, and spaced apart a distance $c$, wherein $d$ is less than $a/2$ but greater than $\frac{1}{4}''$, $b$ is less than $2a$ but greater than $a$, and $a-d+c$ falls within the range from about $0.85b$ to about $1.15b$, said second link including a body portion extending on one side of said first axis and a distal end portion at a distance greater than $a$ from said second axis, said distal end portion being adapted to extend across a line through said axes, on the side of said first axis opposite said second axis, when said body portion is adjacent said first axis.

10. A linkage drive system as in claim 9 and wherein said third link is of an angular configuration and adapted to extend around said first axis.

11. A linkage drive system as in claim 10 and wherein $a-d+c$ is substantially equal to $b$.

12. A compact gauge including a Bourdon tube sensing element, an indicator, and a linkage connecting said sensing element and said indicator; said linkage including a first link connected to said indicator and supported for pivotal movement about a first axis fixed relative to said gauge, a second link connected to said sensing element and supported for pivotal movement about a second axis fixed relative to said gauge and spaced a distance $a$ from said first axis, and a third link pivotally joined to said first and second links at points spaced distances $d$ and $b$ from said first and second axes, respectively, and spaced apart a distance $c$; and wherein $d$ is less than $a/2$ but greater than $\frac{1}{4}''$, $b$ is less than $2a$ but greater than $a$, and $a-d+c$ falls within the range from about $0.85b$ to about $1.15b$.

13. A gauge as in claim 12 and wherein said second link includes a first portion, and a distal end portion extending at an angle relative to said first portion, said first portion extending on one side of said first axis, said distal end portion being disposed at a distance greater than $a$ from said second axis and extending generally toward said first axis from said first portion to extend on the side of said first axis opposite said second axis when said first portion is adjacent said first axis.

14. A compact gauge including a housing, a Bourdon tube sensing element, an indicator, and a linkage connecting said sensing element and said indicator; said linkage including a first link connected to said indicator and supported for pivotal movement about a first axis disposed centrally of and fixed relative to said housing, a second link connected to said sensing element and supported for pivotal movement about a second axis fixed relative to said housing, said second axis being spaced inward from the periphery of said housing and spaced a distance $a$ from said first axis, and a third link pivotally joined to said first and second links at points spaced distances $d$ and $b$ from said first and second axes, respectively, and spaced apart a distance $c$, wherein $d$ is less than $a/2$ but greater than $\frac{1}{4}''$, $b$ is less than $2a$ but greater than $a$, and $a-d+c$ falls within the range from about $0.85b$ to about $1.15b$, and means extending outward of said second fixed axis, on the side disposed away from said first fixed axis, and connecting said sensing element to said second link.

15. A linkage drive system as in claim 14 and wherein $a-d+c$ is substantially equal to $b$.

References Cited in the file of this patent
UNITED STATES PATENTS

| | | |
|---|---|---|
| 2,368,905 | Wallace | Feb. 6, 1945 |
| 2,732,716 | Smith | Jan. 31, 1956 |
| 2,935,873 | Stewart | May 10, 1960 |
| 2,990,646 | Berger | July 4, 1961 |
| 3,045,505 | Boehlow | July 24, 1962 |

UNITED STATES PATENT OFFICE
CERTIFICATE OF CORRECTION

Patent No. 3,127,771                              April 7, 1964

Karl L. Diehl

It is hereby certified that error appears in the above numbered patent requiring correction and that the said Letters Patent should read as corrected below.

Column 8, line 30, strike out "A linkage drive system as in claim 14 and wherein" and insert instead -- A compact gauge as in claim 14 and wherein --.

Signed and sealed this 2nd day of March 1965.

(SEAL)
Attest:

ERNEST W. SWIDER
Attesting Officer

EDWARD J. BRENNER
Commissioner of Patents